US011302907B2

United States Patent
Han et al.

(10) Patent No.: US 11,302,907 B2
(45) Date of Patent: Apr. 12, 2022

(54) POSITIVE ELECTRODE FOR LITHIUM-SULFUR BATTERY COMPRISING MAGHEMITE AND LITHIUM-SULFUR BATTERY COMPRISING THE SAME

(71) Applicant: LG CHEM, LTD., Seoul (KR)

(72) Inventors: Suenghoon Han, Daejeon (KR); Jungmi Moon, Daejeon (KR); Kwonnam Sohn, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 165 days.

(21) Appl. No.: 16/484,319

(22) PCT Filed: Oct. 15, 2018

(86) PCT No.: PCT/KR2018/012109
§ 371 (c)(1),
(2) Date: Aug. 7, 2019

(87) PCT Pub. No.: WO2019/093668
PCT Pub. Date: May 16, 2019

(65) Prior Publication Data
US 2019/0386292 A1    Dec. 19, 2019

(30) Foreign Application Priority Data

Nov. 8, 2017    (KR) .................. 10-2017-0147712

(51) Int. Cl.
*H01M 4/136* (2010.01)
*H01M 4/133* (2010.01)
(Continued)

(52) U.S. Cl.
CPC ........... *H01M 4/136* (2013.01); *H01M 4/133* (2013.01); *H01M 4/583* (2013.01);
(Continued)

(58) Field of Classification Search
None
See application file for complete search history.

(56) References Cited

U.S. PATENT DOCUMENTS

| 4,865,834 A * | 9/1989 | Tanihara | G11B 5/70689 |
| | | | 423/634 |
| 2010/0092865 A1 * | 4/2010 | Kanno | C04B 41/87 |
| | | | 429/221 |

(Continued)

FOREIGN PATENT DOCUMENTS

| CN | 103730664 A | 4/2014 |
| CN | 101719545 A | 6/2020 |

(Continued)

OTHER PUBLICATIONS

Wikipedia: Iron (III) oxide (Wikipedia's "Iron (III) Oxide" page as published on Jan. 27, 2018; https://en.wikipedia.org/w/index.php?title=Iron(III)_oxide&oldid=822614759) (Year: 2018).*

(Continued)

*Primary Examiner* — Jeremiah R Smith
(74) *Attorney, Agent, or Firm* — Birch, Stewart, Kolasch & Birch, LLP

(57) ABSTRACT

A positive electrode of a lithium-sulfur battery including maghemite as an additive and a lithium-sulfur battery including the same. The maghemite obtained by heat treatment of lepidocrocite adsorbs lithium polysulfide (LiPS) generated from a lithium-sulfur battery, thereby improving the charging/discharging efficiency and capacity of the battery, as well as increasing the life of the battery.

5 Claims, 4 Drawing Sheets

(51) Int. Cl.
H01M 4/58 (2010.01)
H01M 4/583 (2010.01)
H01M 4/62 (2006.01)
H01M 4/88 (2006.01)
H01M 10/052 (2010.01)
H01M 10/0563 (2010.01)

(52) U.S. Cl.
CPC ......... *H01M 4/5815* (2013.01); *H01M 4/621* (2013.01); *H01M 4/8882* (2013.01); *H01M 10/052* (2013.01); *H01M 10/0563* (2013.01)

(56) References Cited

U.S. PATENT DOCUMENTS

| | | |
|---|---|---|
| 2011/0068295 A1 | 3/2011 | Beck et al. |
| 2012/0213920 A1 | 8/2012 | Yanagita et al. |
| 2015/0171419 A1 | 6/2015 | Shevchenko et al. |

FOREIGN PATENT DOCUMENTS

| | | |
|---|---|---|
| JP | 2009-292704 A | 12/2009 |
| JP | 2013-105668 A | 5/2013 |
| JP | 2016-105359 A | 6/2016 |
| KR | 10-2004-0034224 A | 4/2004 |
| KR | 10-0482279 A | 4/2005 |
| KR | 10-2012-0096425 A | 8/2012 |
| KR | 10-2013-0089355 A | 8/2013 |
| KR | 10-2014-0087389 A | 7/2014 |
| KR | 10-2017-0001374 A | 1/2017 |
| WO | WO 2013/035274 A1 | 3/2013 |

OTHER PUBLICATIONS

Extended European Search Report for European Application No. 18876547.3, dated Jan. 3, 2020.

Zhao et al., "Prussian blue-derived $Fe_2O_2$/sulfur composite cathode for lithium-sulfur batteries," Materials Letters, vol. 137, 2014 (published online Sep. 1, 2014), pp. 52-55.

Li et al., "Magnetic Field-Controlled Lithium Polysulfide Semiliquid Battery with Ferrofuidic Properties", Nano Letters, vol. 15, 2015, pp. 7394-7399.

Xie et al., "Ferroelectric-Enhanced Polysulfide Trapping for Lithium-Sulfur Battery Improvement," Advanced Materials, vol. 29, 1604724, 2017. pp. 1-6.

Abbasi et al., "Synthesis, characterization and electrochemical performances of y-$Fe_2O_3$ cathode material for Li-ion batteries", Journal of Materials Science: Materials in Electronics, 27(8), Aug. 2016, pp. 7953-7961 (Total No. pp. 9).

International Search Report issued in PCT/KR2018/012109 (PCT/ISA/210), dated Apr. 11, 2019.

Kanzaki et al., "Nano-sized y-$Fe_2O_3$ as lithium battery cathode", Journal of Power Sources, 146, 2005, pp. 323-326.

Manuel et al., "Surface-modified maghemite as the cathode material for lithium batteries", Journal of Power Sources, 184, 2008, pp. 527-531.

Vargas et al., "Enhanced Electrochemical Performance of Maghemite/Graphene Nanosheets Composite as Electrode in Half and Full Li-Ion Cells", Electrochimica Acta, 130, 2014, pp. 551-558.

\* cited by examiner

POSITIVE ELECTRODE FOR LITHIUM-SULFUR BATTERY COMPRISING MAGHEMITE AND LITHIUM-SULFUR BATTERY COMPRISING THE SAME

TECHNICAL FIELD

This application claims the benefit of priority based on Korean Patent Application No. 10-2017-0147712, filed Nov. 8, 2017, and all the contents disclosed in the literatures of the corresponding Korea patent applications are included as a part of the present specification.

The present invention relates to a positive electrode for a lithium-sulfur battery comprising maghemite as a positive electrode additive, and a lithium-sulfur battery having the improved discharging capacity and improved battery life by having such a positive electrode.

BACKGROUND ART

Secondary batteries have become important electronic components for portable electronic devices since the 1990s as an electric storage device capable of continuous charging and discharging unlike the primary battery which can only discharge once. In particular, since a lithium ion secondary battery was commercialized by Sony in Japan in 1992, it has led the information age as a key component of portable electronic devices such as smart phones, digital cameras and notebook computers.

In recent years, lithium ion secondary batteries are rapidly growing in demand from electric sources of cleaner and power tool, medium-sized batteries to be used in fields such as electric bicycles and electric scooters, to large capacity batteries for applications such as electric vehicle (EV), hybrid electric vehicle (HEV), plug-in hybrid electric vehicle (PHEV), and various robots and electric power storage systems (ESS), while further widening application area.

However, the lithium secondary battery, which has the best characteristics among the secondary batteries known to date, has several problems in being actively used in transportation vehicles such as electric vehicles and PHEVs, and among them, the biggest problem is the limit in capacity.

The lithium secondary battery basically consists of materials such as positive electrode, electrolyte, and negative electrode. Among them, since the positive and negative electrode materials determine the capacity of the battery, the lithium ion secondary battery is limited in capacity due to the material limitations of positive and negative electrodes. In particular, since the secondary battery used in applications such as electric vehicles and PHEVs should be able to last as long as possible after charging once, the discharging capacity of the secondary battery is very important. One of the biggest constraints to the sale of electric vehicles is that the distance that can be traveled after one charge is much shorter than those of ordinary gasoline engine vehicles.

The limitation of the capacity of such a lithium secondary battery is difficult to be completely solved due to the structure and material constraints of the lithium secondary battery despite of much effort. Therefore, in order to fundamentally solve the problem of the capacity of the lithium secondary battery, it is required to develop a new concept secondary battery that goes beyond the existing secondary battery concept.

The lithium-sulfur secondary battery is a new high capacity and low-cost battery system which goes beyond capacity limits determined by the intercalation/deintercalation reaction of lithium ions to the layered structure of the metal oxide and graphite which is the basic principle of existing lithium ion secondary battery, and which can lead to replacement of transition metals and cost savings.

The lithium-sulfur secondary battery has a theoretical capacity of 1,675 mAh/g derived from a conversion reaction of lithium ion and sulfur ($S_8+16Li^++16e^-\rightarrow 8Li_2S$) and the negative electrode enables the battery system to have very high capacity using lithium metal (theoretical capacity: 3,860 mAh/g). Also, since the discharging voltage is about 2.2 V, the theoretical energy density is 2,600 Wh/kg based on the amount of the positive electrode and the negative electrode active material. These values are 6 to 7 times higher than the energy theoretical energy density of 400 Wh/kg of commercially available lithium secondary battery ($LiCoO_2$/graphite) which uses layered metal oxides and graphite. After the lithium-sulfur secondary battery was found to be able to dramatically improve battery performance through the formation of nanocomposites around 2010, the lithium-sulfur secondary battery is attracting attention as a new high capacity, eco-friendly, low-cost lithium secondary battery and is currently being studied intensively around the world as a next-generation battery system.

One of the main problems of the lithium-sulfur secondary battery revealed to date is that since sulfur has an electrical conductivity of about $5.0\times10^{-14}$ S/cm and thus is close to nonconductor, electrochemical reaction at the electrode is not easy, and due to the very large overvoltage, the actual discharging capacity and voltage are far below the theoretical value. Early researchers tried to improve the performance by methods such as mechanical ball milling of sulfur and carbon or surface coating with carbon, but there was no substantial effect.

In order to effectively solve the problem of limiting the electrochemical reaction by electrical conductivity, it is necessary to reduce the particle size to a size of several tens of nanometers or less and to conduct surface treatment with a conductive material, as in the example of $LiFePO_4$ (electrical conductivity: $10^{-9}$ to $10^{-10}$ S/cm) which is one of the other positive electrode active materials, and for this purpose, various chemical (melt impregnation into nano-sized porous carbon nanostructures or metal oxide structures) and physical (high energy ball milling) methods and the like have been reported.

Another major problem associated with the lithium-sulfur secondary battery is the dissolution of lithium polysulfide into the electrolyte, which is the intermediate product of sulfur generated during discharging. As the discharging is proceeded, sulfur ($S_8$) continuously reacts with lithium ions and thus the phases thereof are continuously changed into $S_8\rightarrow Li_2S_8\rightarrow (Li_2S_6)\rightarrow Li_2S_4\rightarrow Li_2S_2\rightarrow Li_2S$ or the like, and among them, $Li_2S_8$ and $Li_2S_4$(lithium polysulfide), which are long chains of sulfur, are easily dissolved in a general electrolyte used in a lithium ion battery. When this reaction is occurred, not only the reversible positive electrode capacity is greatly reduced but also the dissolved lithium polysulfide diffuses into the negative electrode and causes various side reactions.

In particular, lithium polysulfide causes a shuttle reaction especially during the charging process, and as a result, the charging capacity is continuously increased, and the charging/discharging efficiency is rapidly deteriorated. Recently, in order to solve such a problem, various methods have been proposed, which can be divided broadly into a method of improving the electrolyte, a method of improving the surface of a negative electrode, a method of improving the properties of a positive electrode and the like The method of improving the electrolyte is a method to suppress the shuttle reaction as much as possible by using new electrolytes, such as functional liquid electrolytes, polymer electrolytes, and ionic liquids, which have a novel composition, and thus controlling the dissolution of the polysulfide into the electrolyte or controlling the dispersion rate to the negative electrode through adjustment of the viscosity and the like.

Studies on controlling the shuttle reaction by improving the characteristics of SEI formed on the surface of the negative electrode have been actively carried out. Typically, there is a method of adding an electrolyte additive such as $LiNO_3$ to form an oxide film of $Li_xNO_y$ or $Li_xSO_y$ on the surface of a lithium negative electrode, a method of forming a thick functional SEI layer on the surface of lithium metal, or the like.

Finally, as a method of improving the properties of the positive electrode, there is a method of forming a coating layer on the surface of the positive electrode particles to prevent the dissolution of the polysulfide, adding a porous material capable of capturing the dissolved polysulfide and so on. Typically, a method of coating the surface of a positive electrode structure containing a sulfur particle with a conductive polymer, a method of coating the surface of a positive electrode structure with a metal oxide on which lithium ions are transferred, a method of adding a porous metal oxide having a large specific surface area and a large pore size to a positive electrode, which is capable of absorbing a large amount of lithium polysulfide, a method of attaching a functional group capable of adsorbing lithium polysulfide onto the surface of a carbon structure, a method of wrapping sulfur particles using graphene or graphene oxide, or the like was proposed.

Although such efforts are under way, these methods are not only complicated, but also have a problem that the amount of sulfur that can be added, which is an active material, is limited. Therefore, it is necessary to develop new technologies to solve these problems and to improve the performance of lithium-sulfur battery.

PRIOR ART DOCUMENT

Patent Document (Patent Document 1) Korean Patent No. 10-0482279 (Mar. 31, 2005), "Iron oxide nano-powder and preparation method thereof"
(Patent Document 2) Korean Patent Publication No. 10-2015-0091280 (Jan. 4, 2017), "Lithium sulfur battery and manufacturing method thereof"

DISCLOSURE

Technical Problem

In order to solve the above-mentioned problems, the inventors of the present invention predicted that if the positive electrode characteristics of the lithium-sulfur battery is improved, the battery performance will be improved most directly, and thus have conducted various studies in this respect and confirmed that the adsorption of lithium polysulfide (LiPS) is possible by introducing maghemite into a positive electrode for a lithium-sulfur battery, thereby completing the present invention.

Therefore, it is an object of the present invention to contribute to an increase in discharging capacity of a lithium-sulfur battery and increase the life of the lithium-sulfur battery by adsorbing lithium polysulfide to increase the reactivity of the positive electrode.

Technical Solution

In order to achieve the above object, the present invention provides a positive electrode for a lithium-sulfur battery comprising a positive electrode active material, a conductive material a binder, and maghemite.

In one embodiment of the present invention, the maghemite may be in a form of secondary particles, which secondary particles include primary particles of a plate shape.

In one embodiment of the present invention, the primary particles may have a particle diameter of more than 1 nm and less than 1000 nm, in particular, 50 to 500 nm.

In one embodiment of the present invention, the secondary particles may be spherical in shape.

In one embodiment of the present invention, the secondary particles may have a particle diameter of 1 to 50 μm.

In one embodiment of the present invention, a content of maghemite in the positive electrode for the lithium-sulfur battery may be 0.1 to 15 parts by weight based on 100 parts by weight of the solid materials of the positive electrode.

In one embodiment of the present invention, the positive electrode active material may be a sulfur-carbon composite.

Also, the present invention provides a lithium-sulfur battery comprising a positive electrode, a negative electrode, a separator interposed between the positive electrode and the negative electrode, and an electrolyte, wherein the positive electrode comprises maghemite.

Advantageous Effects

When the maghemite of the present invention is applied to the positive electrode of the lithium-sulfur battery, the lithium polysulfide generated during the charging/discharging of the lithium-sulfur battery is adsorbed, thereby increasing the reactivity of the positive electrode of the lithium-sulfur battery, and the lithium-sulfur battery employing it can exhibit the effect of increasing discharging capacity and life.

BEST MODE

Figure 1:
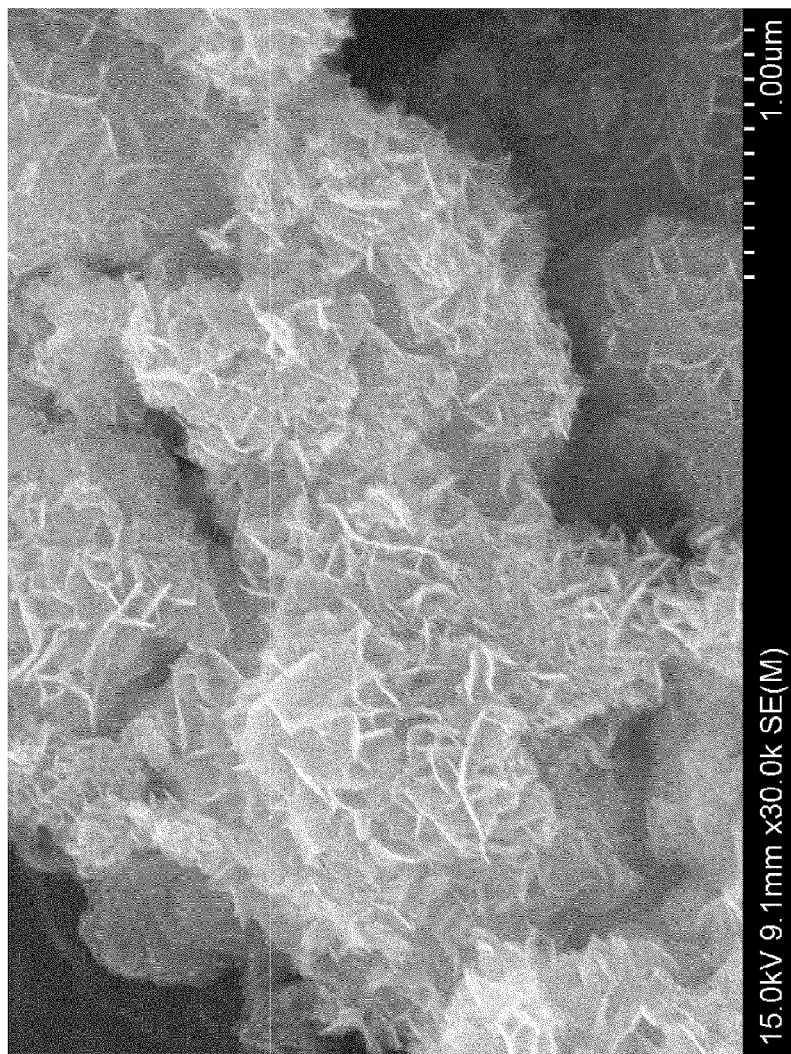
FIG. 1 shows a scanning electron microscope (SEM) image of the maghemite according to the present invention.

Hereinafter, the contents of the present invention will be described in more detail. However, it is to be understood that the following description merely illustrates the most representative embodiments in order to facilitate understanding of the present invention and the scope of the present invention is not limited thereto and that the present invention encompasses the full scope of equivalents to the following description.

The present invention provides a positive electrode for a lithium-sulfur battery, which is improved in the problem of the continuous degradation of the reactivity of the electrode and the problem of the reduction of the discharging capacity due to the dissolution and shuttle phenomenon of polysulfide by complementing the disadvantages of the positive electrode for a conventional lithium-sulfur battery.

Specifically, the positive electrode for the lithium sulfur-battery provided in the present invention comprises an active material, a conductive material and a binder, and is characterized by further comprising maghemite Specifically, in the present invention, the maghemite is comprised in the positive electrode of the lithium-sulfur battery and adsorbs lithium polysulfide, thereby mitigating the transfer of the lithium polysulfide into the negative electrode and thus the reduction of the life of lithium-sulfur battery, and by suppressing the reduced reactivity due to the lithium polysulfide, the discharge capacity of the lithium-sulfur battery comprising the positive electrode can be increased and the battery life can be improved.

Positive Electrode for Lithium-Sulfur Battery

The present invention provides a positive electrode for a lithium-sulfur battery comprising an active material, a conductive material and a binder, wherein the positive electrode comprises maghemite.

At this time, the positive electrode of the lithium-sulfur battery can be manufactured by placing base solid materials comprising an active material, a conductive material and a binder on a current collector.

As the current collector, it is preferable to use aluminum, nickel or the like excellent in conductivity.

In one embodiment, the maghemite may be comprised in an amount of 0.1 to 15 parts by weight, preferably 1 to 10 parts by weight, based on 100 parts by weight of the base solid materials comprising the active material, the conductive material and the binder. If the amount of maghemite is less than the lower limit of the above range, the adsorption effect of polysulfide may be insignificant. If the amount of maghemite exceeds the upper limit, the capacity of the electrode is reduced, which is undesirable.

The maghemite may be a maghemite prepared by the following preparation method of the present invention.

That is, the maghemite comprised in the positive electrode for the lithium-sulfur battery according to the present invention can be prepared by a preparation method comprising steps of (1) mixing and reacting $Fe(NO_3)_3 \cdot 9H_2O$ and a reducing agent represented by the following formula (1); and (2) after step (1), subjecting to a heat treatment under an inert gas atmosphere:

$$M^1(BH_4)x \quad \text{[Formula 1]}$$

wherein $M^1$ is any one selected from Li, Na, Mg, K and Ca, and X is 1 or 2.

First, the step (1) is a step of preparing lepidocrocite. $Fe(NO_3)_3 \cdot 9H_2O$ and the reducing agent represented by formula 1 may all be in the form of an aqueous solution, and an aqueous solution of $Fe(NO_3)_3 \cdot 9H_2O$ may be added to an aqueous solution of the reducing agent represented by formula 1, and then mixed and reacted.

If the mixing and reaction are proceeded on the contrary, the purity of the lepidocrocite produced may be reduced. That is, when the aqueous solution of the reducing agent represented by formula 1 is added to the aqueous solution of $Fe(NO_3)_3 \cdot 9H_2O$ and then mixed and reacted, the purity of the lepidocrocite produced may be reduced.

The aqueous solution of $Fe(NO_3)_3 \cdot 9H_2O$ may have a concentration of 0.04 to 0.08 M, preferably 0.05 to 0.06 M. If the concentration is less than 0.04 M, the yield of lepidocrocite can be lowered. If the concentration is more than 0.08 M, the properties of the subsequently produced maghemite may not be suitable for use as a positive electrode material for a lithium-sulfur secondary battery.

The aqueous solution of the reducing agent represented by formula 1 may have a concentration of 0.2 to 0.5 M, preferably 0.3 to 0.4 M. If the concentration is less than 0.2 M, lepidocrocite is not produced. If the concentration is more than 0.5 M, the reaction may not be proceeded.

According to a preferred embodiment of the present invention, the reducing agent represented by formula 1 may be $NaBH_4$.

When the aqueous solution of $Fe(NO_3)_3 \cdot 9H_2O$ is reacted with the aqueous solution of $NaBH_4$, lepidocrocite can be synthesized naturally in an aqueous solution phase after the $Fe^{3+}$ cation is converted to the Fe metal form.

The mixing of $Fe(NO_3)_3 \cdot 9H_2O$ and the reducing agent represented by formula 1 may be performed within a short time, and may be performed within 10 to 120 seconds, preferably within 50 to 80 seconds. If the mixing time is less than 10 seconds, the mixing may occur excessively and the gas may be generated all at once, and thus the reaction may be proceeded unevenly. If the mixing time is more than 120 seconds, since the mixing speed is slow, the phase difference between the substance generated in the initial reaction and the substance generated in the latter reaction may occur.

The reaction temperature may be 10 to 60° C., preferably 20 to 50° C., more preferably 20 to 25° C. If the reaction temperature is lower than 10° C., the reaction may not be proceeded. If the reaction temperature is higher than 60° C., the properties of lepidocrocite produced may be denatured. Also, in order to control the reaction rate, it may be preferable to carry out the reaction while maintaining the temperature at 20 to 25° C.

Also, the time period of the reaction may be 10 minutes to 20 hours, preferably 40 minutes to 2 hours. If he time period of the reaction is less than 10 minutes, lepidocrocite may not be formed. If he time period of the reaction is more than 20 hours, the shape of the subsequently produced maghemite may not be suitable as a positive electrode material for a lithium-sulfur secondary battery. In particular, when the reaction is carried out for 40 minutes to 2 hours, the desired physical properties of lepidocrocite can be maintained without being lost.

Meanwhile, after the step of reacting the aqueous solution of $Fe(NO_3)_3 \cdot 9H_2O$ with the aqueous solution of the reducing agent represented by formula 1, filtration and drying steps may be further comprised.

The filtration step may be performed by a filtration process commonly used in the art, and for example, a filter paper may be used.

The drying step may be carried out at 70 to 90° C. for 6 to 12 hours.

If the drying temperature is lower than 70° C. or the drying time is less than 6 hours, since lepidocrocite is not completely dried, lepidocrocite in the form of particle cannot be obtained. If the drying temperature and the drying time are more than 90° C. and more than 12 hours respectively, the remaining water may be boiled and the physical properties of lepidocrocite may be denatured.

The lepidocrocite produced by the method as described above may be γ-FeOOH, and specifically may be crystalline γ-FeOOH.

Thereafter, the lepidocrocite produced in step (1) may be heat-treated under an inert gas atmosphere to produce a maghemite. The maghemite can be generated via the following reaction scheme 1:

2FeOOH(s)→Fe$_2$O$_3$(s)+H$_2$O(g)  [Reaction Scheme 1]

The inert gas atmosphere may be (i) an inert gas atmosphere in which the gas inside the reactor is replaced with an inert gas, or (ii) a state in which an inert gas is continuously introduced and the gas inside the reactor is continuously replaced. In case (ii), for example, the flow rate of the inert gas may be 1 to 500 mL/min, specifically 10 to 200 mL/min, more specifically 50 to 100 mL/min.

Here, the inert gas may be selected from the group consisting of nitrogen, argon, helium, and mixtures thereof.

The heat treatment according to the present invention may be performed at 250 to 600° C. If the temperature is less than the above range, lepidocrocite may not be converted to maghemite. If the temperature exceeds the above range, the particle structure of maghemite can be collapsed and can be changed into an undesired particle due to sintering phenomenon, lepidocrocite can be converted into ε-Fe$_2$O$_3$ and thus the desired maghemite cannot be produced. Therefore, the temperature is appropriately adjusted in the above range.

In addition, the heat treatment may be performed for 1 to 4 hours and at the rate of temperature rise in the range of 0.1° C. per minute to 10° C. per minute. If the time period of the heat treatment is less than the above range, since the temperature for preparing the maghemite is not reached, the maghemite cannot be produced. If the time period exceeds the above range, since the temperature for heat treatment rises too much, the particle structure of maghemite can be collapsed and can be changed into a particle having an undesired size due to sintering phenomenon, and ε-Fe$_2$O$_3$ other than maghemite may be generated. Therefore, the time period for the heat treatment is appropriately adjusted in the above range.

The prepared maghemite may have a shape of secondary particles composed by agglomerating a maghemite of primary particles of a plate type, wherein the secondary particles may be spherical. However, the shape of the maghemite produced above can be, as needed, controlled by controlling the reaction time, and all of them can be applied as a positive electrode material of lithium-sulfur secondary battery.

The prepared primary particles of a plate type may have a particle diameter of more than 1 nm and less than 1000 nm, preferably 50 to 500 nm. The secondary particle composed by agglomerating primary particles may have a particle diameter of 1 to 50 μm, preferably 1 to 20 μm. As the particle diameter of the secondary particles is decreased within the above range, it is suitable as a positive electrode material for lithium-sulfur secondary battery. If the particle diameter of the secondary particles exceeds the above range, the particle diameter is too large to be suitable for a positive electrode material for the lithium-sulfur secondary battery.

When maghemite such as crystalline γ-Fe$_2$O$_3$ prepared by the preparation method of maghemite as described above is applied to a lithium-sulfur secondary battery, the performance of the lithium-sulfur secondary battery can be improved by adsorbing the polysulfide leached during charging/discharging of the lithium-sulfur secondary battery.

FIG. 1 shows a scanning electron microscope (SEM) image of the maghemite prepared by the preparation method as described above. In FIG. 1, it can be seen that the shape of the spherical secondary particles is composed by agglomerating the 'plate type' maghemite prepared according to one embodiment above.

Figure 2:
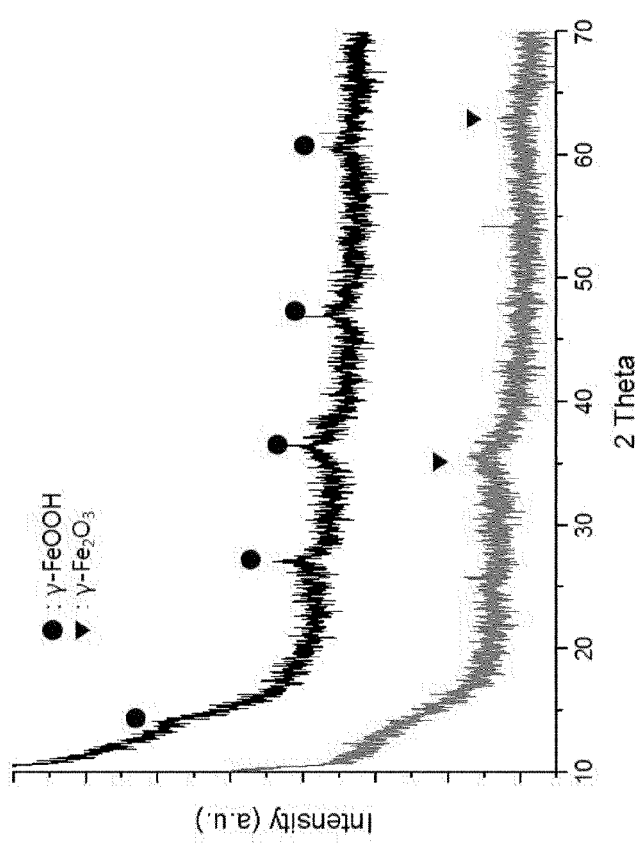
FIG. 2 shows X-ray diffraction (XRD) results of the maghemite according to the present invention.

FIG. 2 shows the data (2θ=about 35°, 2θ=60° to 65°) of the X-ray diffraction analysis (XRD) of the maghemite prepared by the preparation method as described above. It can be confirmed through the effective peak detection in FIG. 2 that maghemite was synthesized.

A significant or effective peak in an X-ray diffraction (XRD) analysis means a peak that is repeatedly detected in XRD data in substantially the same pattern without being greatly affected by analysis conditions or analysis practitioner. In other words, A significant or effective peak means a peak having a height, intensity, strength, etc., which can be at least 1.5 times, preferably at least 2 times, more preferably at least 2.5 times the background level.

Meanwhile, among the base solid materials constituting the positive electrode of the present invention, the active material may comprise elemental sulfur (S$_8$), a sulfur-based compound, or a mixture thereof. Specifically, the sulfur-based compound may be Li$_2$S$_n$(n≥1), an organic sulfur compound, a carbon-sulfur composite ((C$_2$S$_x$)$_n$: x=2.5~50, n≥2) or the like.

The positive electrode for a lithium-sulfur battery according to the present invention may preferably comprise the active material of a sulfur-carbon composite. Sulfur alone is not electrically conductive and thus can be used in combination with a conductive material. The addition of maghemite according to the present invention does not affect the maintenance of this sulfur-carbon composite structure.

The active material may be preferably used in an amount of 50 to 95 parts by weight, more preferably about 70 parts by weight, based on 100 parts by weight of the base solid materials. If the active material is comprised in an amount less than the above range, the reaction of the electrode is difficult to be sufficiently exerted. Even if the active material is comprised in an amount more than the above range, since the content of other conductive materials and binders is relatively insufficient and it is difficult to exhibit sufficient electrode reaction, it is preferable to determine an appropriate content within the above range.

Among the base solid materials constituting the positive electrode of the present invention, the conductive material is a material that electrically connects an electrolyte to a positive electrode active material and serves as a path through which electrons move from the current collector to the sulfur, and is not particularly limited as long as it has porosity and conductivity without causing chemical changes in the battery. For example, graphite materials such as KS6; carbon blacks such as Super P, carbon black, Denka black, acetylene black, Ketjen black, channel black, furnace black, lamp black, and thermal black; carbon derivatives such as fullerene; conductive fibers such as carbon fiber and metal fiber; metal powders such as carbon fluoride, aluminum and nickel powder; or conductive polymers such as polyaniline, polythiophene, polyacetylene, and polypyrrole are used alone or in combination.

The conductive material may be preferably used in an amount of 1 to 10 parts by weight, preferably about 5 parts by weight, based on 100 parts by weight of base solid materials. If the content of the conductive material contained in the electrode is less than the above range, the unreacted portion of the sulfur in the electrode is increased and eventually the capacity is reduced. If the content exceeds the above range, the high efficiency discharging characteristic and the charging/discharging cycle life are adversely affected. Therefore, it is desirable to determine the appropriate content within the above-mentioned range.

The binder in the base solid materials is a material that is comprised to cause a slurry composition of the base solid materials that forms a positive electrode to adhere well to the current collector, and a substance which is well dissolved in a solvent and which can constitute a conductive network between a positive electrode active material and a conductive material is used as the binder. Unless otherwise specified, all binders known in the art can be used, and preferably poly(vinyl)acetate, polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride(PVdF), polyhexafluoropropylene, copolymer(product name: Kynar) of polyvinylidene fluoride, poly(ethyl acrylate), polytetrafluoroethylenepolyvinylchloride, polytetrafluoroethylene, polyacrylonitrile, polyvinylpyridine, polystyrene, carboxy methyl cellulose, siloxane-based binder such as polydimethylsiloxane, rubber-based binder comprising styrene-butadiene rubber, acrylonitrile-butadiene rubber and styrene-isoprene rubber, ethyleneglycol-based binder such as polyethylene glycol diacrylate and derivatives thereof, blends thereof, and copolymers thereof may be used, but the present invention is not limited thereto.

The binder may be used in an amount of 1 to 10 parts by weight, preferably about 5 parts by weight, based on 100 parts by weight of the base composition contained in the electrode. If the content of the binder resin is less than the above range, the physical properties of the positive electrode are degraded, and thus the positive electrode active material and the conductive material can be dropped off. If the content of the binder resin exceeds the above range, the ratio of the active material to the conductive material in the positive electrode may be relatively decreased, thereby reducing the battery capacity. Therefore, it is preferable that the content of the binder resin is determined from the appropriate content within the above-mentioned range.

As described above, a positive electrode comprising maghemite and base solid materials can be prepared by conventional methods.

For example, in preparing the positive electrode slurry, first, after the maghemite is dispersed in a solvent, the obtained solution is mixed with an active material, a conductive material and a binder to obtain a slurry composition for forming a positive electrode. Thereafter, this slurry composition is coated on a current collector and dried to complete a positive electrode. At this time, if necessary, the electrode can be manufactured by compression-molding on the current collector to improve the density of the electrode.

At this time, a solvent capable of not only uniformly dispersing a positive electrode active material, a binder and a conductive material but also easily dissolving maghemite can be used as the solvent. As such a solvent, water is most preferable as an aqueous solvent, and the water may be a secondary distilled water (DW) or a tertiary distilled water (DIW). However, it is not necessarily limited thereto, and if necessary, a lower alcohol which can be easily mixed with water may be used. Examples of the lower alcohol comprise methanol, ethanol, propanol, isopropanol, and butanol, and they may be used in mixture with water.

Lithium-Sulfur Battery

Meanwhile, the present invention provides a lithium-sulfur battery comprising a positive electrode, a negative electrode, a separator interposed therebetween, and an electrolyte, wherein the positive electrode is a positive electrode as described above.

At this time, the negative electrode, separator, and electrolyte may be made of conventional materials that can be used in a lithium-sulfur battery.

Specifically, the negative electrode may comprise a material capable of reversibly intercalating or deintercalating lithium ion ($Li^+$), a material capable of reversibly forming lithium containing compounds by reacting with lithium ion, or lithium metal or lithium alloy, as the active material.

The material capable of reversibly intercalating or deintercalating lithium ion ($Li^+$) can be, for example, crystalline carbon, amorphous carbon, or a mixture thereof. In addition, the material capable of reacting with lithium ion ($Li^+$) to reversibly form lithium containing compounds may be, for example, tin oxide, titanium nitrate or silicon. In addition, the lithium alloy may be, for example, an alloy of lithium (Li) and a metal selected from the group consisting of Na, K, Rb, Cs, Fr, Be, Mg, Ca, Sr, Ba, Ra, Al and Sn.

In addition, the negative electrode may further comprise a binder optionally together with a negative electrode active material. The binder acts to cause negative electrode active materials to become a paste and create mutual adhesion between the active materials, adhesion between the active materials and the current collector, and buffer effect for the expansion and contraction of the active materials, etc. Specifically, the binder is the same as that described above.

In addition, the negative electrode may further comprise a current collector for supporting a negative electrode active layer comprising a negative electrode active material and a binder. The current collector may be selected from the group consisting of copper, aluminum, stainless steel, titanium, silver, palladium, nickel, alloys thereof, and combinations thereof. The stainless steel may be surface-treated with carbon, nickel, titanium or silver, and an aluminum-cadmium alloy may be used as the alloy. In addition, sintered carbon, a nonconductive polymer surface-treated with a conductive material, or a conductive polymer may be used.

In addition, the negative electrode may be a thin film of lithium metal.

As the separator, a material capable of separating or insulating the positive electrode and the negative electrode from each other while allowing the lithium ion to be transported therebetween is used. The separator can be used as a separator without any particular limitations as long as it is used as a separator in the lithium-sulfur battery. Particularly, it is desirable to use a separator having excellent wettability to the electrolyte while having low resistance to ion migration of the electrolyte.

More preferably, as the material for the separator, a porous, nonconductive or insulating material can be used, and for example, the separator may be an independent member such as a film, or may comprise a coating layer added to the positive and/or negative electrodes.

Specifically, a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used alone or in a laminate thereof, or a conventional porous nonwoven fabric, for example, a nonwoven fabric made of glass fiber, polyethylene terephthalate fiber or the like with high melting point can be used, but are not limited thereto.

The electrolyte is a non-aqueous electrolyte containing lithium salt and is composed of lithium salt and a solvent, and as the electrolyte solution, non-aqueous organic solvent, organic solid electrolyte and inorganic solid electrolyte are used.

The lithium salt is a substance which can be easily dissolved in a non-aqueous organic solvent, and for example, may be at least one selected from the group consisting of LiCl, LiBr, LiI, LiClO$_4$, LiBF$_4$, LiB$_{10}$Cl$_{10}$, LiB(Ph)$_4$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, lithium chloroborane, lithium lower aliphatic carboxylate, lithium tetraphenyl borate, and lithium imide.

The concentration of the lithium salt may be 0.2 to 2 M, preferably 0.6 to 2 M, more preferably 0.7 to 1.7 M depending on various factors such as the exact composition of the electrolyte mixture, the solubility of the salt, the conductivity of the dissolved salt, the charge and discharge conditions of the battery, the operating temperature and other factors known in the lithium battery field. If the concentration of the lithium salt is less than the above range, the conductivity of the electrolyte may be lowered and thus the performance of the battery may be deteriorated. If the concentration of the lithium salt exceeds the above range, the viscosity of the electrolyte may increase and thus the mobility of the lithium ion (Li$^+$) may be reduced. Accordingly, it is preferable to select an appropriate concentration of the lithium salt within the above range.

The non-aqueous organic solvent is a substance capable of dissolving a lithium salt well, and preferably, aprotic organic solvents such as 1,2-dimethoxyethane, 1,2-diethoxyethane, 1,2-dibutoxyethane, dioxolane (DOL), 1,4-dioxane, tetrahydrofuran, 2-methyltetrahydrofuran, dimethylcarbonate (DMC), diethylcarbonate (DEC), ethylmethylcarbonate (EMC), methylpropylcarbonate (MPC), ethylpropylcarbonate, dipropylcarbonate, butylethylcarbonate, ethylpropanoate (EP), toluene, xylene, dimethyl ether (DME), diethylether, triethylene glycol monomethyl ether (TEGME), diglyme, tetraglyme, hexamethyl phosphoric triamide, gamma-butyrolactone (GBL), acetonitrile, propionitrile, ethylenecarbonate (EC), propylenecarbonate (PC), N-methylpyrrolidone, 3-methyl-2-oxazolidone, acetic acid ester, butyric acid ester and propionic acid ester, dimethyl formamide, sulfolane (SL), methyl sulfolane, dimethyl acetamide, dimethyl sulfoxide, dimethyl sulfate, ethyleneglycol di-acetate, dimethyl sulfite, or ethyleneglycol sulfite can be used alone or in a mixed solvent form of two or more solvents thereof.

As the organic solid electrolyte, preferably, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers comprising ionic dissociation groups and the like can be used.

As the inorganic solid electrolyte of the present invention, preferably, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$ may be preferably used.

Since the lithium-sulfur battery according to the present invention configured as described above comprises maghemite, the lithium polysulfide generated during the charging/discharging of the lithium-sulfur battery is adsorbed, thereby increasing the reactivity of the positive electrode of the lithium-sulfur battery, and the lithium-sulfur battery employing it exhibit the effect of increasing the discharging capacity and life.

Hereinafter, the present invention will be described in more detail with reference to Examples and the like. However, the scope and content of the present invention cannot be construed as narrowing down or limiting the invention by way of example and the like. It will be apparent on the basis of the teachings of the present invention, comprising the following examples that the present invention, in which experimental results are not specifically shown, can be easily carried out by those skilled in the art and that such modifications and variations are intended to fall within the scope of the appended claims.

Preparation Example 1

Preparation of Maghemite 0.05M of Fe(NO$_3$)$_3$·9H$_2$O (product of Aldrich, purity of 98% or more) was mixed with 0.3M of NaBH$_4$ (product of TCL, purity>95%) for 50 seconds. At this time, the mixture was stirred at 25° C. at 400 rpm for 40 minutes, and it was confirmed that hydrogen gas was evolved during the reaction. After filtration through a filter paper, lepidocrocite was prepared by drying at 80° C. for 8 hours by allowing sufficient air to enter.

Thereafter, the lepidocrocite powder prepared above was subjected to the heat treatment at 400° C. for 1 hour by flowing nitrogen gas at a flow rate of 100 mL/min. At this time, the heating rate for heat treatment was set to 10° C. per minute. The maghemite was prepared by the heat treatment.

Example 1

Manufacture of Lithium-Sulfur Battery Comprising Positive Electrode With Maghemite Added First, when adding the maghemite to water as a solvent, the maghemite was added to the base materials (active material, conductive material and binder) in an amount of 10 parts by weight based on the total weight (100 parts by weight) and dissolved. Subsequently, 100 parts by weight of base solid materials, that is, 90 parts by weight of sulfur-carbon composite (S/C 7:3) as an active material, 5 parts by weight of Denka black as a conductive material, 5 parts by weight of styrene butadiene rubber/carboxy methyl cellulose (SBR/CMC 7:3) as a binder were added to the obtained solution and mixed to prepare a slurry composition for the positive electrode.

Subsequently, the slurry composition prepared above was coated on a current collector (Al Foil) and dried at 50° C. for 12 hours to prepare a positive electrode. At this time, the loading amount was set to 3.5 mAh/cm$^2$, and the porosity of the electrode was set to 60%.

Thereafter, a coin cell of a lithium-sulfur battery comprising the positive electrode prepared as described above, a separator, a negative electrode, and an electrolyte solution was prepared as follows. Specifically, the positive electrode was fabricated by punching into a 14-phi circular electrode, the polyethylene (PE) separator was fabricated by punching into a separator of 19 phi and the negative electrode was fabricated by punching lithium metal of 150 um into 16 phi.

Comparative Example 1

Manufacture of Lithium-Sulfur Battery Comprising Positive Electrode Without Maghemite 100 parts by weight of base solid materials, that is, 90 parts by weight of sulfur-carbon composite (S/C 7:3) as an active material, 5 parts by weight of Denka black as a conductive material, 5 parts by weight of styrene butadiene rubber/carboxy methyl cellulose (SBR/CMC 7:3) as a binder were added to water as a solvent and mixed to prepare a slurry composition for the positive electrode.

Subsequently, the slurry composition prepared above was coated on a current collector (Al Foil) and dried at 50° C. for 12 hours to prepare a positive electrode. At this time, the loading amount was set to 3.5 mAh/cm², and the porosity of the electrode was set to 60%.

Thereafter, a coin cell of a lithium-sulfur battery comprising the positive electrode prepared as described above, a separator, a negative electrode, and an electrolyte solution was prepared as follows. Specifically, the positive electrode was fabricated by punching into a 14-phi circular electrode, the polyethylene (PE) separator was fabricated by punching into a separator of 19 phi and the negative electrode was fabricated by punching lithium metal of 150 um into 16 phi.

Comparative Example 2

Manufacture of Lithium-Sulfur Battery Comprising Positive Electrode with Lepidocrocite The same procedure as in Example 1 was carried out, except that the lepidocrocite of Preparation Example 1 instead of maghemite was used in an amount of 10 parts by weight based on base solid materials Experimental Example 1

SEM (Scanning Electron Microscope) Analysis

SEM analysis (Hitachi, S-4800 FE-SEM) was performed on the maghemite prepared in Preparation Example 1.

FIG. 1 shows a SEM image of the maghemite prepared in Preparation Example 1.

Referring to FIG. 1, it can be seen that as a result of SEM analysis at a magnification of 50k, the plate type of maghemite particles are agglomerated, resulting in the spherical secondary particle structure of the maghemite.

Experimental Example 2

XRD Analysis

XRD analysis (Bruker, D4 Endeavor) was performed on the maghemite prepared in Preparation Example 1.

FIG. 2 shows X-ray diffraction (XRD) results of the maghemite prepared in Preparation Example 1.

Referring to FIG. 2, the XRD peak of the maghemite can be confirmed, and from this, it can be seen that the pure maghemite was produced in Preparation Example 1.

Experimental Example 3

Comparison Test of Discharging Capacity of Lithium-Sulfur Battery

The initial discharging capacity depending on the type of positive electrode material was measured using the lithium-sulfur batteries manufactured in Example 1, and Comparative Examples 1 and 2 above. The positive electrode of Example 1 comprises a sulfur-carbon composite and 10 parts by weight of maghemite, and the positive electrode of Comparative Example 1 comprises a sulfur-carbon composite. The positive electrode of Comparative Example 2 comprises a sulfur-carbon composite and 10 parts by weight of lepidocrocite. At this time, the measurement current was 0.1C and the voltage range was 1.8 to 2.5V.

Figure 3:
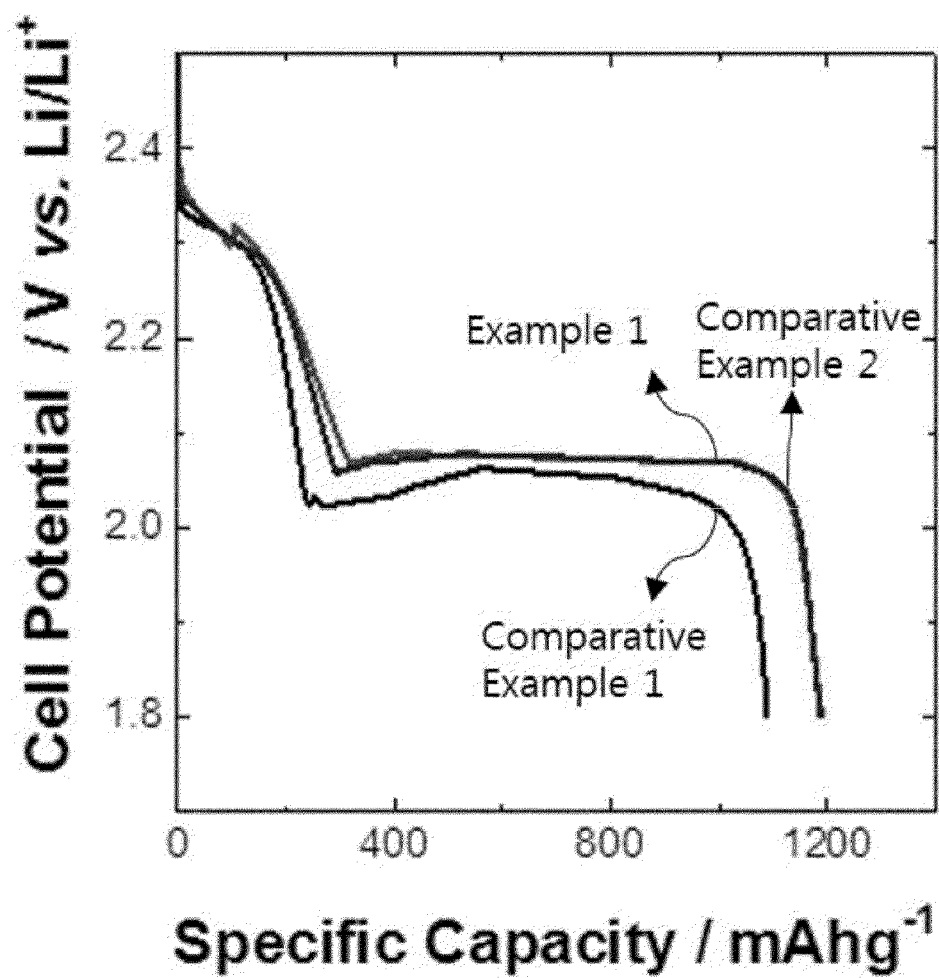
FIG. 3 shows the result of measurement of the initial discharging capacity of the lithium-sulfur battery with the added maghemite according to the present invention.

The measured initial discharging capacity data are presented in Table 1 and FIG. 3.

TABLE 1

| Lithium-sulfur battery | | Initial discharging capacity (mAh/g) |
|---|---|---|
| Negative electrode | Positive electrode | |
| Example 1 | Metal lithium | Sulfur-carbon composite + Maghemite (10 parts by weight) | 1,189 |
| Comparative Example 1 | Metal lithium | Sulfur-carbon composite | 1,088 |
| Comparative Example 2 | Metal lithium | Sulfur-carbon composite + Lepidocrocite (10 parts by weight) | 1,187 |

As a result, as shown in Table 1 and FIG. 3, it was confirmed that the initial discharging capacity of the positive electrode was increased by about 100 mAh/g compared to Comparative Example 1 which did not comprise the maghemite. It was confirmed that the initial discharging capacity was increased to the level equivalent to that of Comparative Example 2 containing lepidocrocite in the positive electrode.

Experimental Example 4

Experiments of Life Characteristics and Discharging Capacity Retention of Lithium-Sulfur Battery The changing aspect of discharging capacity and charging/discharging efficiency retention depending on the cycles of the battery were measured using the lithium-sulfur batteries according to Example 1 and Comparative Examples 1 and 2. At this time, the initial discharging/charging were proceeded at 0.1 C/0.1 C for 2 cycles, then at 0.2 C/0.2 C at the third cycles, and then at 0.5 C/0.3 C from 4 cycles. The voltage range was set to 1.8 to 2.5V.

Figure 4:
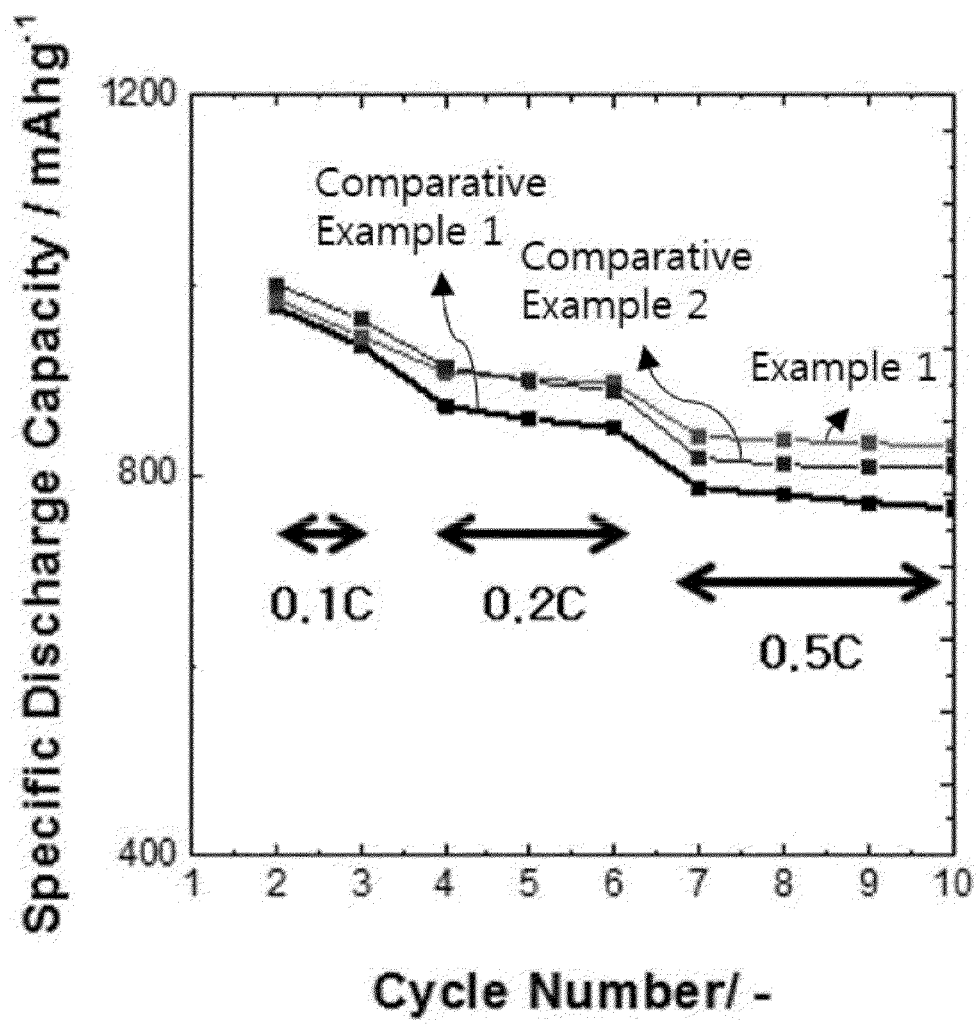
FIG. 4 shows life characteristics and discharging capacity retention at 0.5 C of a lithium-sulfur battery with the added maghemite according to the present invention.

The measured discharging capacity and the capacity retention at 0.5 C discharging depending on the progression of cycles of the battery are presented in Table 2 and the graphs of FIG. 4

TABLE 2

| Lithium-sulfur battery | | 0.5 C Discharging capacity (mAh/g) |
|---|---|---|
| Negative electrode | Positive electrode | |
| Example 1 | Metal lithium | Sulfur-carbon composite + Maghemite (10 parts by weight) | 840 |
| Comparative Example 1 | Metal lithium | Sulfur-carbon composite | 786 |
| Comparative Example 2 | Metal lithium | Sulfur-carbon composite + lepidocrocite (10 parts by weight) | 818 |

Referring to FIG. 4, it can be seen that in the case of Example 1 containing maghemite as compared to Comparative Example 1 which did not contain maghemite in the positive electrode, the rate of reduction of discharging capacity during the progression of the cycles of the battery is small as compared to Comparative Examples 1 and 2. Also, it was confirmed that 0.5C discharging capacity retention is excellent as compared to Comparative Example 2 which comprises lepidocrocite showing the same initial discharging capacity level as in Experimental Example 1.

As a result, it was confirmed that the lithium-sulfur battery comprising the positive electrode containing a maghemite has improved initial discharging capacity and discharging capacity retention at 0.5C.

The invention claimed is:

1. A positive electrode for a lithium-sulfur battery comprising:
    a positive electrode active material, wherein the positive electrode active material is a sulfur-carbon composite;
    a conductive material;
    a binder; and
    maghemite,
    wherein a content of maghemite is 0.1 to 15 parts by weight based on 100 parts by weight of base solid materials,
    wherein a content of conductive material is 1 to 10 parts by weight based on 100 parts by weight of base solid materials,
    wherein the base solid materials comprise the active material, the conductive material and the binder, and
    wherein the maghemite is in a form of secondary particles, which secondary particles comprise primary particles of a plate shape, the primary particles having a particle diameter of 50 nm to 500 nm, and the secondary particles have a particle diameter of 1 μm to 50 μm.

2. The positive electrode for the lithium-sulfur battery according to claim 1, wherein the secondary particles are spherical in shape.

3. The positive electrode for the lithium-sulfur battery according to claim 1, wherein the secondary particles have a particle diameter of 1 to 20 μm.

4. The positive electrode for the lithium-sulfur battery according to claim 1, wherein the content of maghemite is 1 to 10 parts by weight based on 100 parts by weight of base solid materials comprising the active material, the conductive material and the binder.

5. A lithium-sulfur battery comprising:
    a positive electrode for the lithium-sulfur battery according to claim 1;
    a negative electrode;
    a separator interposed between the positive electrode and the negative electrode; and
    an electrolyte.

* * * * *